US011260561B2

(12) United States Patent
Fischer

(10) Patent No.: US 11,260,561 B2
(45) Date of Patent: Mar. 1, 2022

(54) CUTTING CHAMBER HOUSING FOR AN UNDERWATER PELLETIZER

(71) Applicant: MAAG AUTOMATIK GMBH, Grossostheim (DE)

(72) Inventor: Florian Fischer, Ebersberg (DE)

(73) Assignee: MAAG AUTOMATIK GMBH, Grossostheim (DE)

( * ) Notice: Subject to any disclaimer, the term of this patent is extended or adjusted under 35 U.S.C. 154(b) by 0 days.

(21) Appl. No.: 16/828,156

(22) Filed: Mar. 24, 2020

(65) Prior Publication Data
US 2020/0215721 A1 Jul. 9, 2020

Related U.S. Application Data

(63) Continuation of application No. PCT/EP2018/000449, filed on Sep. 25, 2018.

(51) Int. Cl.
*B29B 9/06* (2006.01)
*B29C 48/345* (2019.01)

(52) U.S. Cl.
CPC ............ *B29B 9/065* (2013.01); *B29C 48/345* (2019.02)

(58) Field of Classification Search
CPC .......... B29B 9/065; B29C 2948/92895; B29C 2948/924; B29C 48/265; B29C 48/345; B01F 2009/0056
See application file for complete search history.

(56) References Cited

U.S. PATENT DOCUMENTS

| | | | | |
|---|---|---|---|---|
| 4,321,026 A | * | 3/1982 | Lambertus | B29C 48/0022 425/142 |
| 5,553,797 A | * | 9/1996 | Axelsson | B02C 18/148 241/285.3 |
| 5,624,688 A | * | 4/1997 | Adams | B29C 48/05 425/67 |
| 5,657,934 A | * | 8/1997 | Pirrung | B01J 2/20 241/242 |
| 5,888,554 A | * | 3/1999 | Zollitsch | B01J 2/20 425/71 |
| 6,347,932 B1 | * | 2/2002 | Kim | B29B 9/06 425/71 |
| 2010/0187707 A1 | * | 7/2010 | Muerb | B29B 9/065 264/14 |

FOREIGN PATENT DOCUMENTS

| | | | | |
|---|---|---|---|---|
| EP | 1563897 A1 | * | 8/2005 | ............. B01J 2/20 |
| JP | H11123502 A | * | 5/1999 | ............. B29B 9/06 |

* cited by examiner

*Primary Examiner* — Joseph S Del Sole
*Assistant Examiner* — Ariella Machness
(74) *Attorney, Agent, or Firm* — Rao DeBoer Osterrieder, PLLC; Dileep P. Rao

(57) ABSTRACT

A cutting chamber housing for an underwater pelletizer having an inlet for cooling fluid and an outlet for cooling fluid with pellets. The cutting chamber housing encloses a cutting device having a rotary drive and a cutting head with rotating cutting knives. An extrusion head having a perforated plate projects into the cutting chamber housing. The cutting chamber housing has a stationary upper housing half and a movable lower housing half along a separation plane arranged at an oblique angle so that the cutting chamber housing can be opened at least downwards along the separation plane. Features such as slide rails, swivel joints, or rotary joints can be added to enable easy opening of the cutting chamber housing.

17 Claims, 11 Drawing Sheets

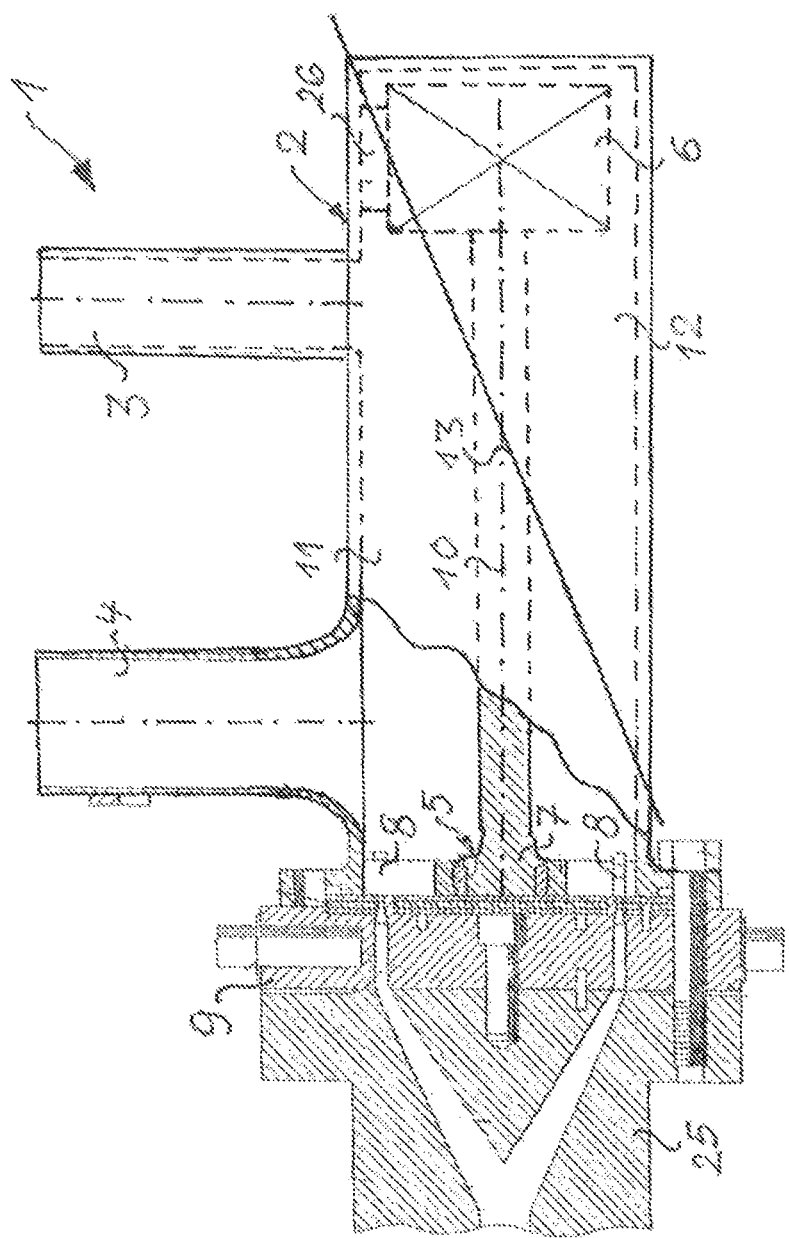
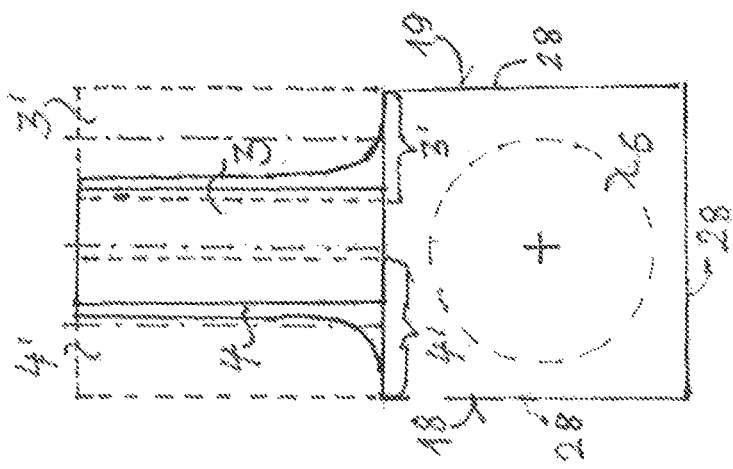
FIGURE 3A
FIGURE 3B

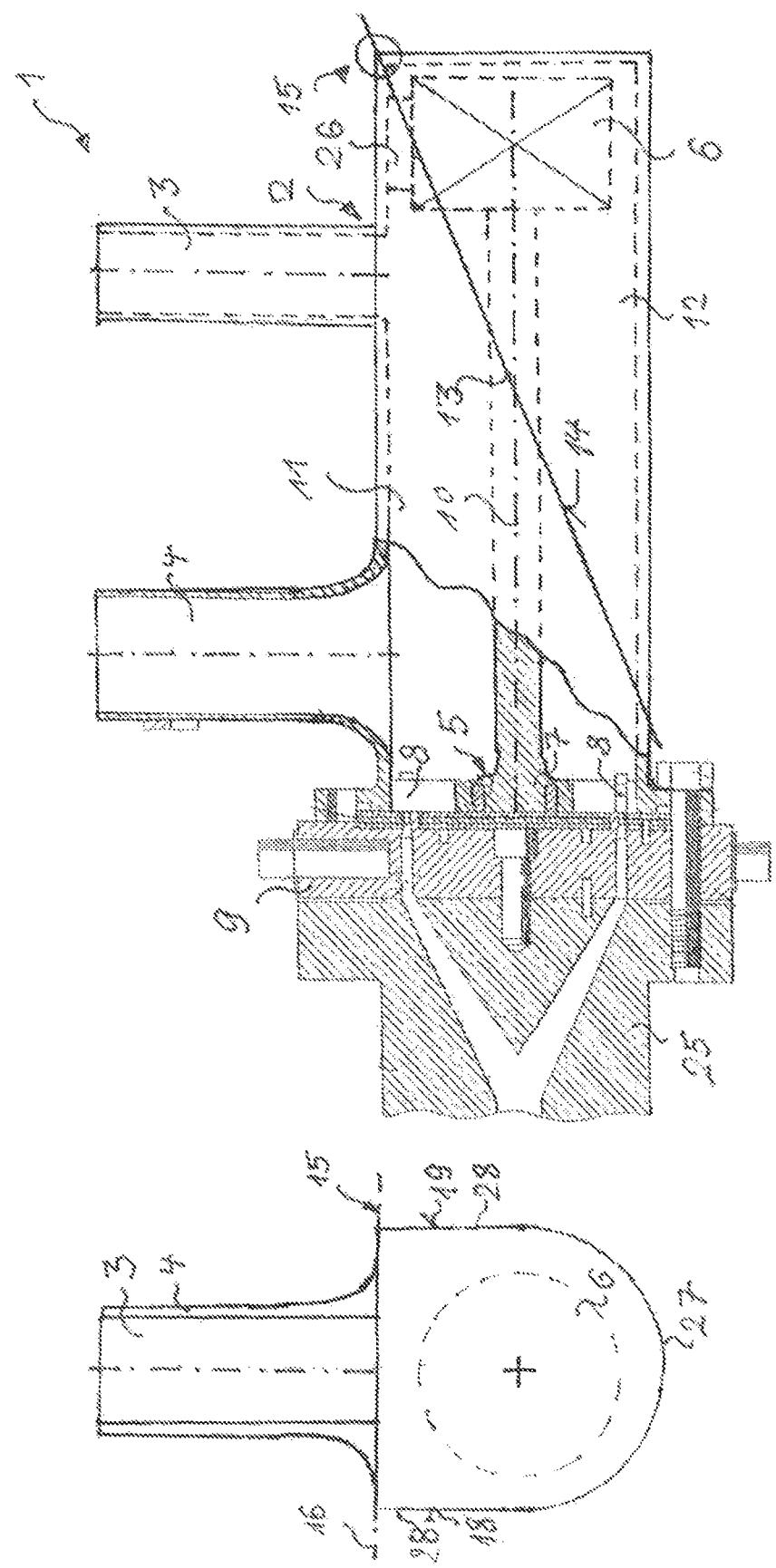

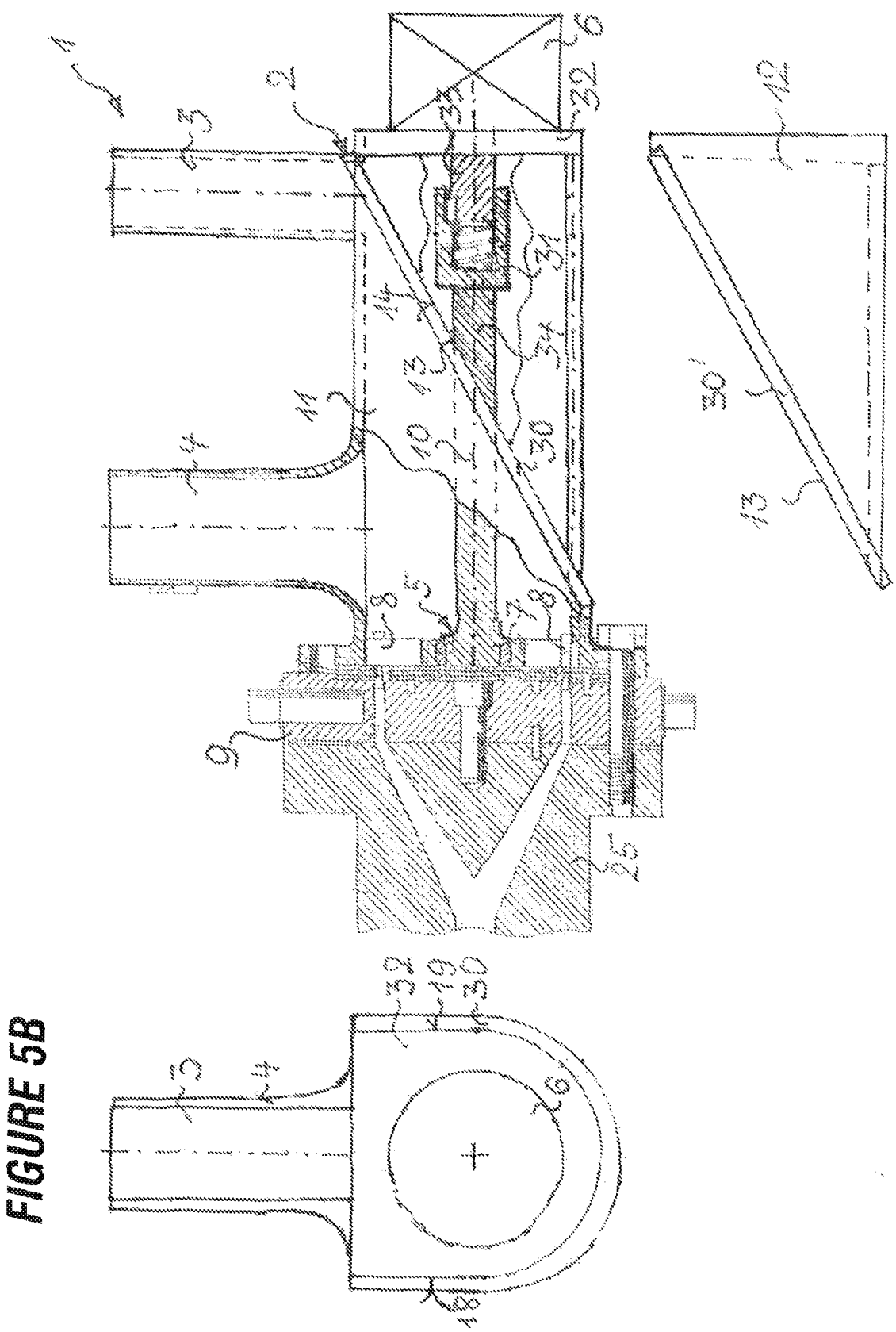

CUTTING CHAMBER HOUSING FOR AN UNDERWATER PELLETIZER

CROSS REFERENCE TO RELATED APPLICATIONS

The present application is a Continuation Application of co-pending International Patent Application No. PCT/EP2018/000449 filed on Sep. 25, 2018, titled "CUTTING CHAMBER HOUSING FOR AN UNDERWATER PELLETIZER", which claims priority to German Patent Application No. 10 2017 009 177.3 filed on Sep. 29, 2017. These references are incorporated herein in their entirety.

FIELD

The present disclosure generally relates to cutting chamber housing for an underwater pelletizer.

BACKGROUND

The present disclosure relates to a cutting chamber housing for an underwater pelletizer having an inlet for cooling fluid and an outlet for cooling fluid with pellets. The cutting chamber housing encloses a cutting device having a rotary drive and a cutting head with rotating cutting knives and an extrusion head having a perforated plate for outputting molten plastic formed into strands, wherein the output direction of the plastic and the axis of rotation of the cutting device are oriented horizontally and/or substantially horizontally, and the inlet direction of the cooling fluid and the outlet direction of the cooling fluid with pellets are oriented vertically and/or substantially vertically thereto.

A cutting chamber housing of this kind is previously known. Prior art discloses an underwater pelletizer having a perforated plate comprising nozzles through which molten material to be processed is extruded in the horizontal direction. A cutting device for cutting the thermoplastic plastic material, which is extruded by the nozzles in the horizontal direction, into pellets is provided in the cutting chamber housing.

For this purpose the cutting device comprises a horizontally oriented axis of rotation, wherein the cut pellets flow through a cooling fluid which flows vertically from an inlet of the cooling fluid below the horizontal axis of rotation to an outlet of the cooling fluid above the horizontal axis of rotation. The cutting chamber housing comprises a circular shape as seen from the front, and the inlet for introducing cooling fluid into the cutting chamber housing as well as the outlet for outputting the cooling fluid with the pellets comprise a diverging shape in order for the cooling medium to be guided to the perforated plate within the cutting chamber housing.

Such a cutting chamber housing forms a compact tubular horizontally oriented container which has no possibilities whatsoever for interfering during the initial stage of underwater pelletizing or during the initial stage of the flowing out of the strand-shaped plastic from the perforated plate, until a thermal balance between the plastic melt flowing out of the perforated plate in the form of strands and the forming of pellets by the rotating cutting knives of the cutting device has been achieved.

Prior art also demonstrates a cutting chamber housing as it is illustrated in detail by FIG. 1 as state of the art.

Due to the typically compact construction of the cutting chamber housing, it has so far been necessary to perform a comparatively long initial stage until constant properties of the extruded material and a stable pelletizing process were achieved.

It is an object of the present disclosure to provide a cutting chamber housing which offers the possibility of interfering both in the initial stage of the forming of the strand-shaped melt in the perforated plate as well as in the initial stage of the pelletizing of the strands at the output of the perforated plate to form pellets, until a stable process flow can be guaranteed, thereby overcoming the disadvantages of the state of the art.

It is an object of the present disclosure for the initial stage during underwater pelletizing to be performed in a more economic manner. Also, for inspection, maintenance, and repair operations, accessibility to the cutting device, the rotary drive, and the drive shaft is improved. This reduces the working times for inspection, maintenance, and repair operations.

BRIEF DESCRIPTION OF THE DRAWINGS

The detailed description will be better understood in conjunction with the accompanying drawings as follows:

FIG. 3A shows an embodiment of the present disclosure with a partially cut-open cuboid cutting chamber housing, in cross-section as a longitudinal view.

FIG. 3B shows an embodiment of the present disclosure with a partially cut-open cuboid cutting chamber housing, in cross-section as a rear side view.

FIG. 4A shows an embodiment of the present disclosure with a swivel joint between the upper and lower cutting chamber housing halves, in cross-section as a longitudinal side view and as a rear side view.

FIG. 5B shows the embodiment pursuant to FIG. 5A with removed lower cutting chamber housing half, in cross-section as a longitudinal side view and a rear side view.

Figure 1:
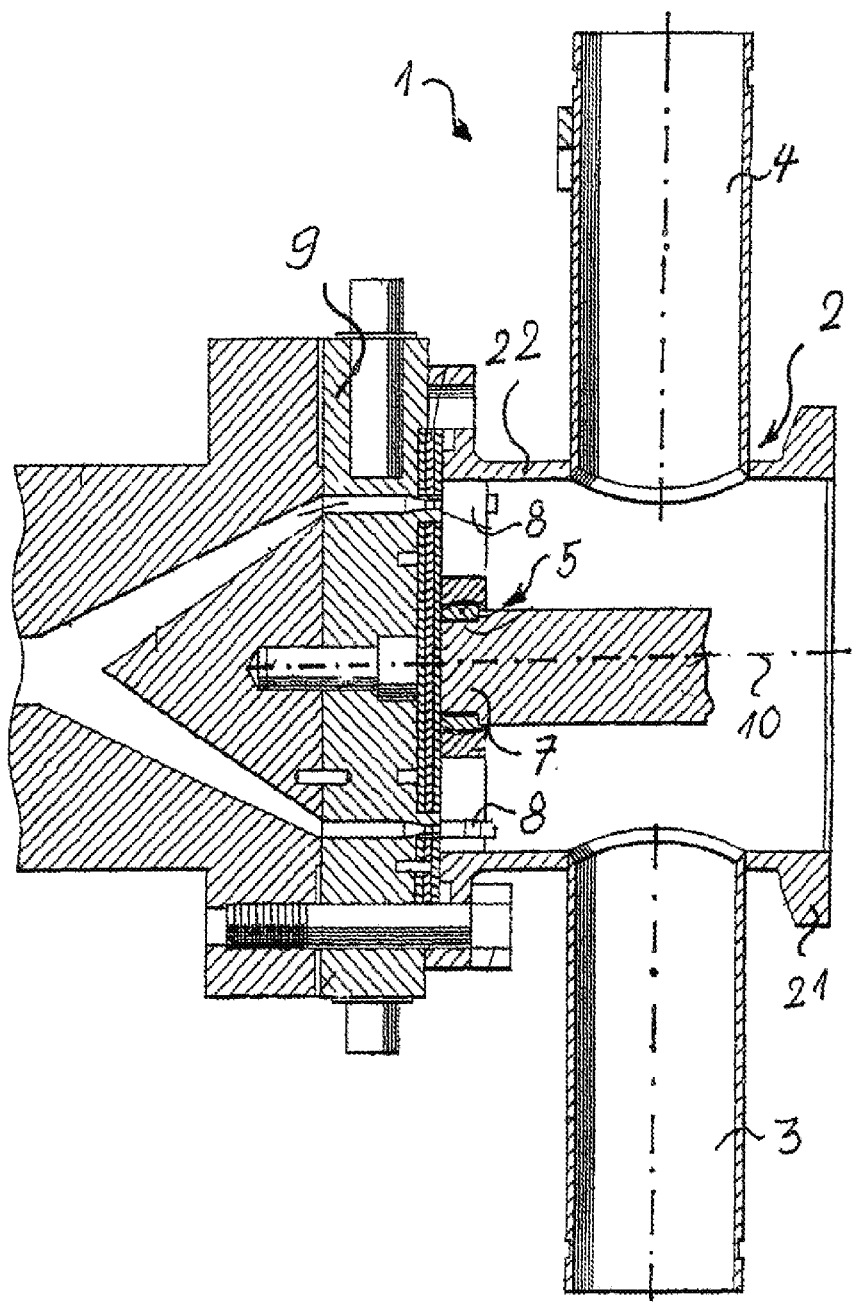
FIG. 1 shows an underwater pelletizer with cutting chamber housing according to the current state of the art.

Embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to cutting chamber housing for an underwater pelletizer.

An embodiment of the present disclosure relates to a cutting chamber housing for an underwater pelletizer having an inlet for cooling fluid and an outlet for cooling fluid with pellets. The cutting chamber housing encloses a cutting device having a rotary drive and a cutting head with rotating cutting knives. An extrusion head having a perforated plate projects into the cutting chamber housing.

From the perforated plate a strand-shaped molten plastic is output in a horizontal direction and is granulated by the rotating cutting knives of the rotary cutting head with a horizontally and/or substantially horizontally (i.e. with a deviation from the horizontal of less than ten degrees) oriented axis of rotation. The inlet direction of the cooling fluid and the outlet direction of the cooling fluid with pellets are oriented vertically and/or vertically thereto, i.e. vertically to the output direction of the plastic melt and/or substantially vertically (i.e. with a deviation from the vertical of less than ten degrees).

The cutting chamber housing can have a stationary vertically upper housing half and a vertically movable lower housing half along a separation plane arranged at an oblique angle with respect to a horizontally oriented output direction of the plastic. The separation plane extends, as seen in a side view of the cutting chamber housing, obliquely in the longitudinal direction of the cutting chamber housing or, as seen in front view of the perforated plate, obliquely in the transverse direction of the cutting chamber housing. The cutting chamber housing can thus be opened at least downwards along the separation plane.

The separation plane may thus extend relative to the output direction obliquely from the bottom below the region of the perforated plate obliquely to the top above the region of the rotary drive, or relative to the output direction obliquely from the top above the region of the perforated plate obliquely to the bottom below the region of the rotary drive or, as seen in front view of the perforated plate, from the left or right top diagonally to the right or left bottom respectively.

The separation plane may be formed as a single-part or multi-part separation plane, possibly with differently inclined plane sections, or as an at least partially curved face, e.g. formed concavely or convexly, or with concave or convex sections of the face.

A cutting chamber housing of this kind has the advantage that, along the separation plane, the vertically lower movable cutting chamber housing half can be shortened, both for the initial stage of the output flow of plastic melt from the perforated plate, and the actual pelletizing stage, by the opening of the cutting chamber housing.

Plastic material which cannot be used in the initial stage may flow freely downwards from the stationary vertically upper cutting chamber housing half until a continuous melt flow and continuous pelletizing of the melt have been reached.

Moreover, after swiveling away and/or removing the movable lower cutting chamber housing half for inspection, maintenance, and repair purposes, accessibility to the components of the underwater pelletizer which are enclosed by the cutting chamber housing can be facilitated, thereby making maintenance or repairs more economical.

The orientation of the separation plane at an oblique angle in accordance with the present disclosure yields a specifically shaped upper and/or lower housing half which, by the obliquely extending edges along the separation plane, experience additional stiffening of the lateral regions, thereby improving their manageability since this prevents self-distortion of the respective housing halves.

In one embodiment the separation plane extends, as already mentioned, along a diagonal of the cutting chamber housing which extends, relative to the output direction of the plastic melt, obliquely from the bottom below the region of the perforated plate obliquely to the top above the region of the rotary drive. This diagonal solution has the advantage that sealing possibilities can be provided at several side edges with regard to the separation plane. Also, removable or movable connection elements between the upper stationary housing and the lower movable housing can be easily mounted.

Persons having ordinary skill in the art can select a separation plane extending at any desired oblique angle or combination of angles.

In one of the possible embodiments the lower movable housing half is pivotally connected with the upper stationary housing half by at least one swivel joint. Since in the case of a cuboid cutting chamber housing, four edge sides are determined by the separation plane, this will result in four variants of applying a lateral swivel joint. Persons having ordinary skill in the art can select placement of the swivel joint based upon the needs of a specific application.

In embodiments, the swivel joint is arranged between the upper stationary housing half and the lower movable housing half such that its swivel axis is arranged horizontally and above the region of the rotary drive and is oriented substantially orthogonally to the output direction of the plastic melt from the perforated plate. By means of a pivot joint the lower movable housing half can swing off downwards without being hindered by the rotary drive.

The lower cutting chamber half can be moved away from the stationary housing half around the horizontal axis and the opening can vary from a narrow gap to a full opening width of the separation plane between the stationary upper housing half and the movable lower housing half.

When the cutting chamber housing is closed by joining the lower housing half with the upper housing half, the cutting chamber housing is at the same time sealed against the loss of cooling fluid by appropriate sealing inserts in the edges of the two housing halves along the separation plane. An alternate arrangement of the swivel axis horizontally and below the region of the rotary drive is also possible. An alternate arrangement of the swivel axis vertically or in the region above or below the region of the perforated plate can also be implemented.

Instead of a horizontal orientation of the swivel axis above the rotary drive, in embodiments, the swivel joint is arranged between the upper stationary housing half and the lower movable housing half such that its swivel axis is arranged along the oblique separation plane on a front or a rear boundary edge of the cutting chamber housing.

In the case of a cuboid cutting chamber housing the swivel axis can be on a rear or front boundary edge. In the case of a tub-shaped design of the cutting chamber housing this can only be performed in the region in which the front and the rear boundary walls extend in a linear fashion. This can shorten the length of the swivel axis, but the effect with respect to the opening and closing of the movable cutting chamber housing half is not influenced, since half the swivel axis length is sufficient to safely couple the movable cutting chamber housing half with the stationary upper cutting chamber housing half. persons having ordinary skill in the art will recognize that clamping elements must be provided to press the two housing halves onto each other in the edge regions.

A much larger range of variants is offered by embodiments in which the lower movable housing half is rotatably connected with the upper stationary housing half by at least one rotary joint. The rotary joint can be arranged at any point along the separation plane between the upper stationary housing and the lower movable housing. It has to be taken into account that the rotary joint can be of multi-axis design so as to expose the rotary drive if necessary.

In embodiments, the swivel joint can comprise two rotary joints oriented along the swivel axis. These two rotary joints, oriented along the swivel axis can serve practically as a swivel joint and may correspondingly be arranged at external edge sides of the cutting chamber housing with the advantage that they are only arranged pointwise in the region of the respective swivel axis and not continuously like a traditional swivel joint.

In further embodiments it is provided that the lower movable housing half is slidably connected by means of sliding elements with slide bars of the upper stationary housing half. For this purpose the upper stationary housing half comprises, in the region of the oblique separation plane, a front or a rear slide bar on the front or the rear boundary edge of the cutting chamber housing, respectively, and that sliding elements which are slidably engaged with the slide bars are arranged at the lower movable housing half.

Due to the rotary drive, sliding along the separation plane is only possible in a restricted manner, so that this embodiment opens merely a gap between the upper stationary housing half and the lower movable housing half during the sliding of the lower movable housing half along the separation plane. However, a vertically lower gap may be sufficient to discharge the initial material which is initially not usable for the production in the initial stage of the output flow of plastic melt from the perforated plate or in the initial stage of the cutting device. This embodiment, therefore, is capable of shortening the initial stages substantially.

In embodiments, the lower movable housing half can be connected with the upper stationary housing half with latching elements. For this purpose, the edges both of the upper stationary housing half and of the lower movable housing half can comprise flanges via which the latching elements can be engaged in a fixing manner The flanges, in the edges of the upper and lower cutting chamber housing halves can be sealed medium-tightly by means of appropriate sealing materials and can be separated from each other after removing of the latching elements for the initial stages of the perforated plate and the cutting device.

In embodiments the lower movable housing half can be lockably connected with the upper stationary housing half along the oblique separation plane by means of a linear bayonet lock.

In embodiments the inlet for cooling fluid and the outlet for cooling fluid with pellets can be arranged at the upper stationary housing half at a distance from each other. Due to this arrangement there is no supply of cooling fluid through a movable lower housing half, which has no stationary inlet and may be moved independently of the inlet and the outlet.

In embodiments the cutting device with the rotary drive and the cutting head with rotating cutting knives can be arranged at the upper stationary housing half, wherein the rotary drive partially projects out of the upper stationary housing half downwards from the separation plane. For this purpose, the upper housing half can comprise a connection element by which the rotary drive is kept in a stationary, but removable position. This simplifies the construction of the lower cutting chamber housing half substantially.

In embodiments the lower movable housing half can comprise deflection structures or fins transferring the cooling fluid, which enters the cutting chamber housing from the inlet arranged at the stationary housing at a distance to the cutting head vertically from the top. These structures can create a spiral circulation between the upper and lower housing halves, supply the cutting head with cooling fluid, and deflect the cooling fluid with pellets vertically upwards into the outlet. This deflection can be achieved by a tub-shaped design of the cutting chamber housing. Additionally, helically arranged deflection sheets can be arranged in the lower housing half to assist the deflection into a circular stream of the cooling fluid.

In embodiments, the lower and upper housing halves can comprise pressure casting material of a metal alloy, such as a bronze aluminum alloy which forms, due to the aluminum content, an aluminum oxide skin on the outer surfaces and thus prevents corrosion and oxidation by the cooling fluid.

Turning now to the Figures, FIG. 1 shows an underwater pelletizer with cutting chamber housing according to the current state of the art.

In this embodiment, a horizontally oriented flanged socket 22 forms the cutting chamber housing 2 which has a rotary drive (not illustrated) flanged thereto by means of an annular flange 21. Orthogonally to the horizontally oriented flanged socket 22, the cutting chamber housing 2 comprises a tubular inlet 23 for the cooling fluid which is oriented vertically from the bottom to the output direction of the plastic from the perforated plate 9 of an extrusion head 25, so that the cooling fluid flows around the knife holder and/or the axis thereof and can flow vertically upwards to a tubular outlet 24 for the cooling fluid with pellets.

As is clearly shown, the cutting chamber housing 2 is a compact welded crossing of flanged sockets forming the horizontal flanged socket 22 of the cutting chamber housing 2 and the flanged sockets for the tubular inlet 23 and the tubular outlet 24 of the cutting chamber housing 2 which are additionally arranged vertically thereto.

This compact design of the cutting chamber housing 2 does not allow for interference in the procedure during the initial stage of the forming of the strand-shaped plastic melt in the perforated plate 9 and the subsequent pelletizing by the cutting device 5 since the cutting chamber housing 2 constitutes a stationary allocation between the horizontal output of the plastic melt from the perforated plate 9 and the vertical outlet 24 of the cut pellets by means of the vertical flowing of the cooling fluid from the bottom to the top.

Figure 2A:
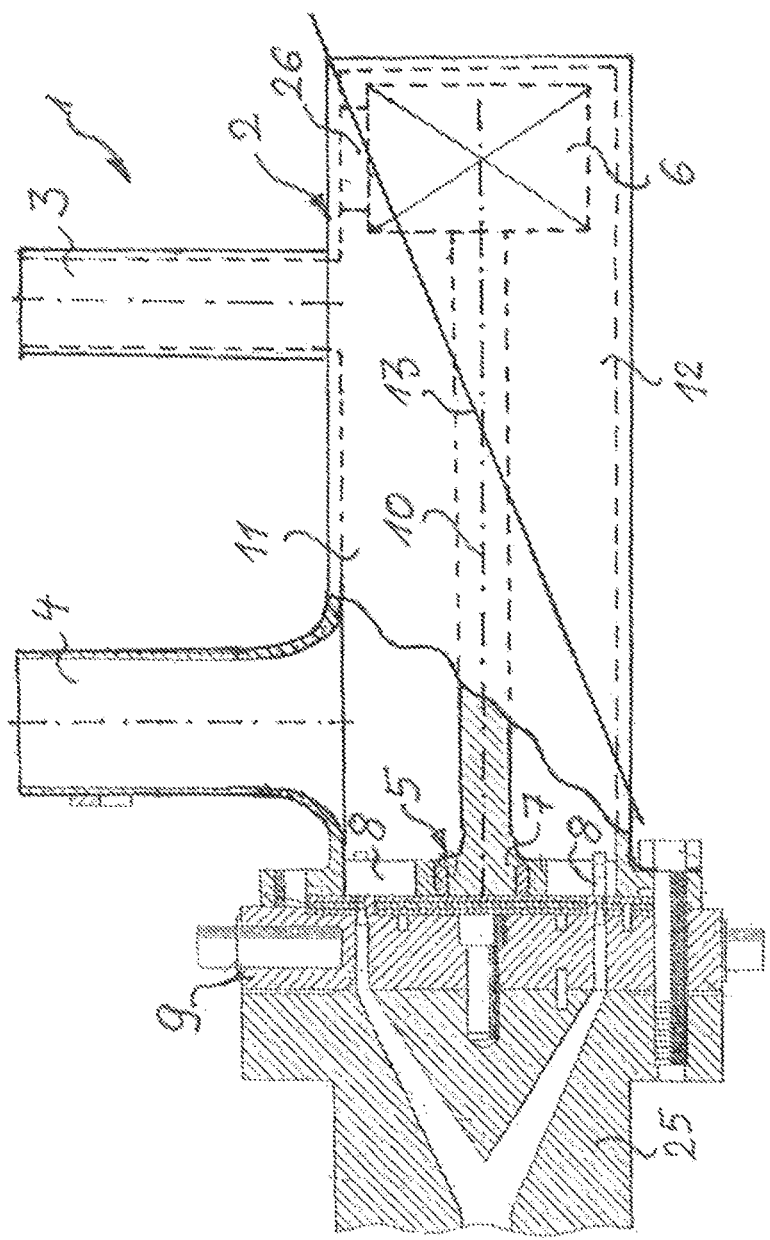
FIG. 2A shows an embodiment of the present disclosure with a partially cut-open tub-shaped cutting chamber housing, in cross-section as a longitudinal side view.

FIG. 2A shows an embodiment of the present disclosure with a partially cut-open tub-shaped cutting chamber housing, in cross-section as a longitudinal side view.

Underwater pelletizer 1 with a tub-shaped cutting chamber housing 2 which is partially cut open in cross-section so as to illustrate that the cutting chamber housing 2 encloses a cutting device 5 with a cutting head 7 and cutting knives 8 arranged at the cutting head 7.

The cutting chamber housing 2 encloses a rotary drive 6 with a horizontally arranged axis of rotation 10. The tub-shaped cutting chamber housing 2 is divided by a separation plane 13 into a vertically upper stationary cutting chamber housing half 11 and a vertically lower movable cutting chamber housing half 12.

In this embodiment of the present disclosure, the rotary drive 6 is suspended on the upper stationary cutting chamber housing half 11 and projects downwardly from this upper cutting chamber housing half 11, as is illustrated by the dashed lines and the separation plane 13. For this purpose, the rotary drive 6 is arranged at the upper stationary cutting chamber housing half 11 by means of a removable fastening element 26. Furthermore, both an inlet 3 for cooling fluid and an outlet 4 for cooling fluid with pellets, which are oriented vertically upwards in the longitudinal side view are arranged on the upper stationary cutting chamber housing half 11.

Figure 2B:
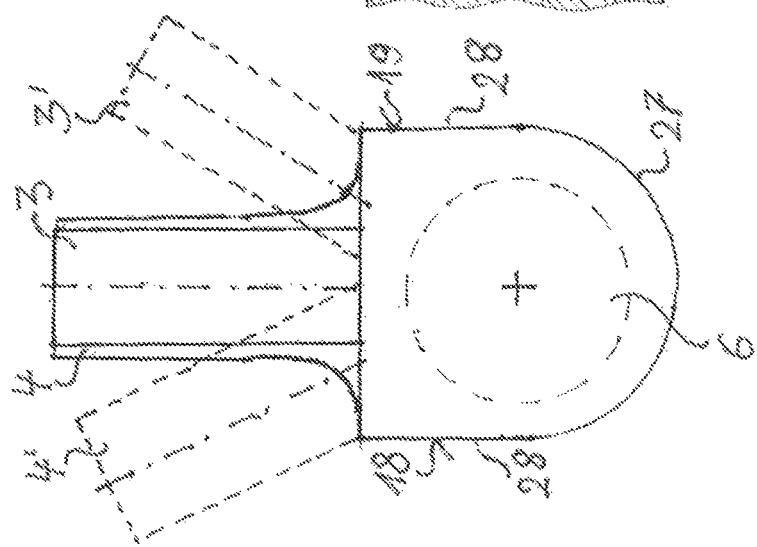
FIG. 2B shows an embodiment of the present disclosure with a partially cut-open tub-shaped cutting chamber housing, in cross-section as a rear side view.

FIG. 2B shows an embodiment of the present disclosure with a partially cut-open tub-shaped cutting chamber housing, in cross-section as a rear side view.

An inlet 3 for cooling fluid projects vertically from the tub-shaped cutting chamber housing 2, and likewise vertically an outlet 4 for cooling fluid and pellets. In the rear side view the inlet 3' for cooling fluid and the outlet 4' for cooling fluid with pellets are alternatively, as is shown by the dashed lines, oriented vertically to each other at an acute angle. Due to the angular arrangement of the inlet 3' and the outlet 4' a helical circulation of the cooling fluid flowing in from the top from the inlet 3' in the tub-shaped cutting chamber housing 2 in the direction of the cutting device 5 can be created in in cooperation with the tub-shaped design of the lower housing half 12 which acts as a deflection structure 27.

The tub-shaped design of the cutting chamber housing comprises only partially linear edge regions 28 in the separation plane 13, the rest defines a curved deflection structure 27.

The lower cutting chamber housing half 12 is moreover completely free of fluid inlets and fluid outlets and forms a more or less removable, displaceable or swing-away lower cap. The advantages of such a lower swing-away, displaceable or removable lower cutting chamber housing half 12 have already been discussed in detail above.

FIG. 3A shows an embodiment of the present disclosure with a partially cut-open cuboid cutting chamber housing, in cross-section as a longitudinal view.

FIG. 3B shows an embodiment of the present disclosure with a partially cut-open cuboid cutting chamber housing, in cross-section as a rear side view.

Due to the cuboid design of the cutting chamber housing in this embodiment, smooth linear edge regions 28 result along the separation plane 13. These linear edge regions 28 are advantageously suited to connect the two cutting chamber housing halves in a medium-tight manner, for instance, by means of lateral flanges.

As compared to the embodiment shown in FIG. 2, where the lower housing half is of semicircular design and thus promotes a circulation of the cooling fluid flowing in through the inlet 3, this embodiment promotes the forming of a circulating cooling fluid in the cuboid cutting chamber housing 2, deflection structures (not illustrated) can additionally be provided. Moreover, by the parallel displacing, as is indicated by the dashed lines in FIG. 2B, of the inlet 3' for the cooling medium and the vertically projecting outlet 4' for the cooling medium with pellets, the circulation of the cooling medium in the cutting chamber housing can be further assisted.

FIG. 4A shows an embodiment of the present disclosure with a swivel joint between the upper and lower cutting chamber housing halves, in cross-section as a longitudinal side view and as a rear side view.

Shown here is a swivel joint 15 between the upper and lower cutting chamber housing halves 11 and 12. The swivel joint 15 is arranged at the upper end of a diagonal 14 as a separation plane 13 of the tub-shaped cutting chamber housing 2, wherein its swivel axis 16 is oriented horizontally and at right angles to the output direction of the plastic from the perforated plate 9 above the rotary drive 6.

A corresponding swivel axis 16 can be at any linear boundary edge, such as the front boundary edge 18 or the rear boundary edge 19 and therefore confine the opening between the upper housing half 11 and the lower housing half 12 to a gap. A small opening can be sufficient to examine the functionality of the perforated plate and the horizontally emanating plastic mass, as well as the cutting function of the cutting device 5, in order to shorten these initial stages as compared to conventional cutting chamber housing structures as shown in FIG. 1.

Figure 4B:
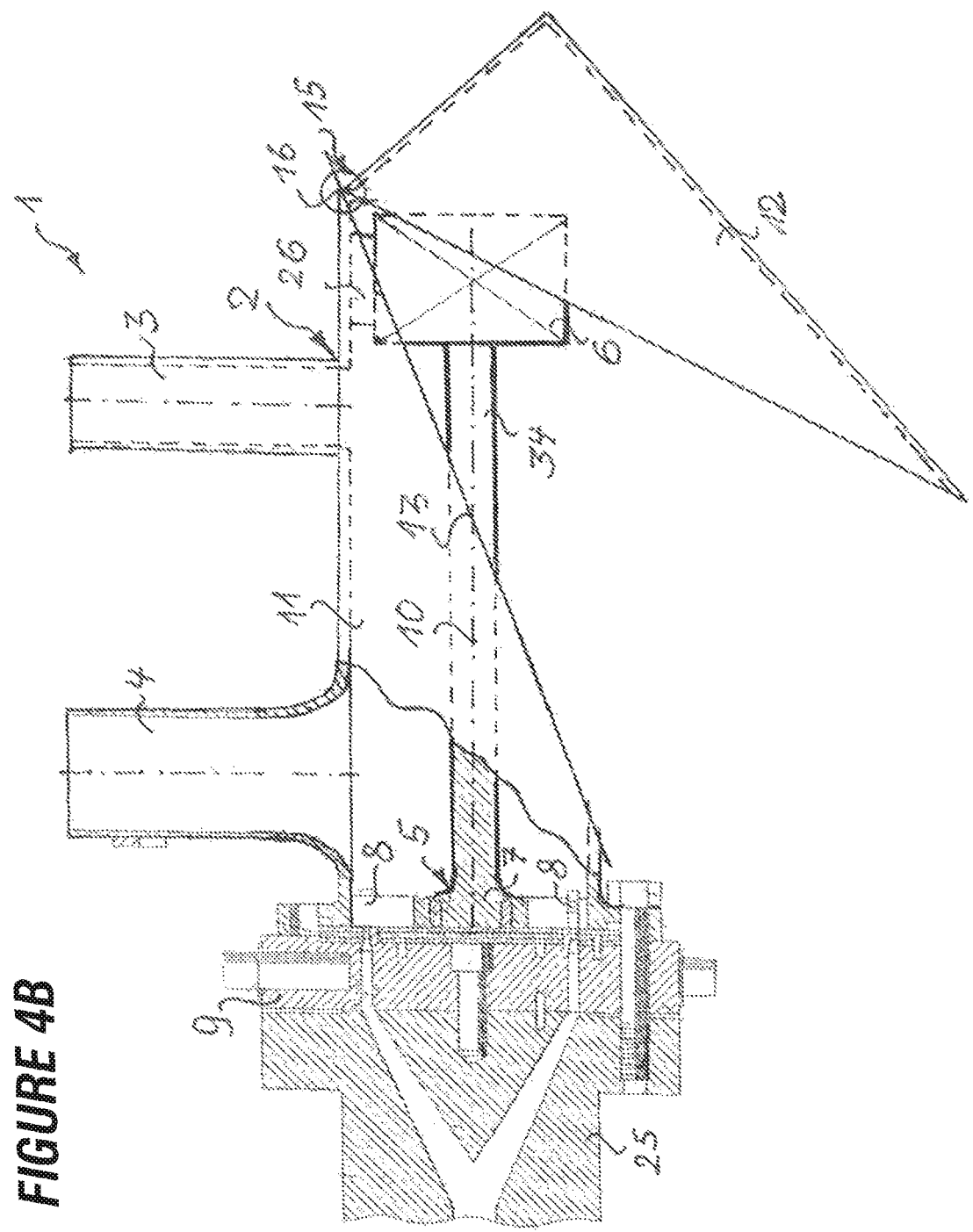
FIG. 4B shows the embodiment pursuant to FIG. 4A with the lower cutting chamber housing half swiveled away, in cross-section as a longitudinal side view.

FIG. 4B shows the embodiment in FIG. 4A with the lower cutting chamber housing half swiveled away, in cross-section as a longitudinal side view.

The lower cutting chamber housing half 12 is swung down about the horizontally oriented swivel axis 16 of the swivel joint 15. By means of this swinging or hinging device, it is possible to position the lower movable housing half 12 gradually along the separation plane 13. The gap between the upper cutting chamber housing half 11 and the lower movable cutting chamber housing half 12 can range from a minimal gap size to a complete swinging away of the lower housing half 12.

Figure 5A:
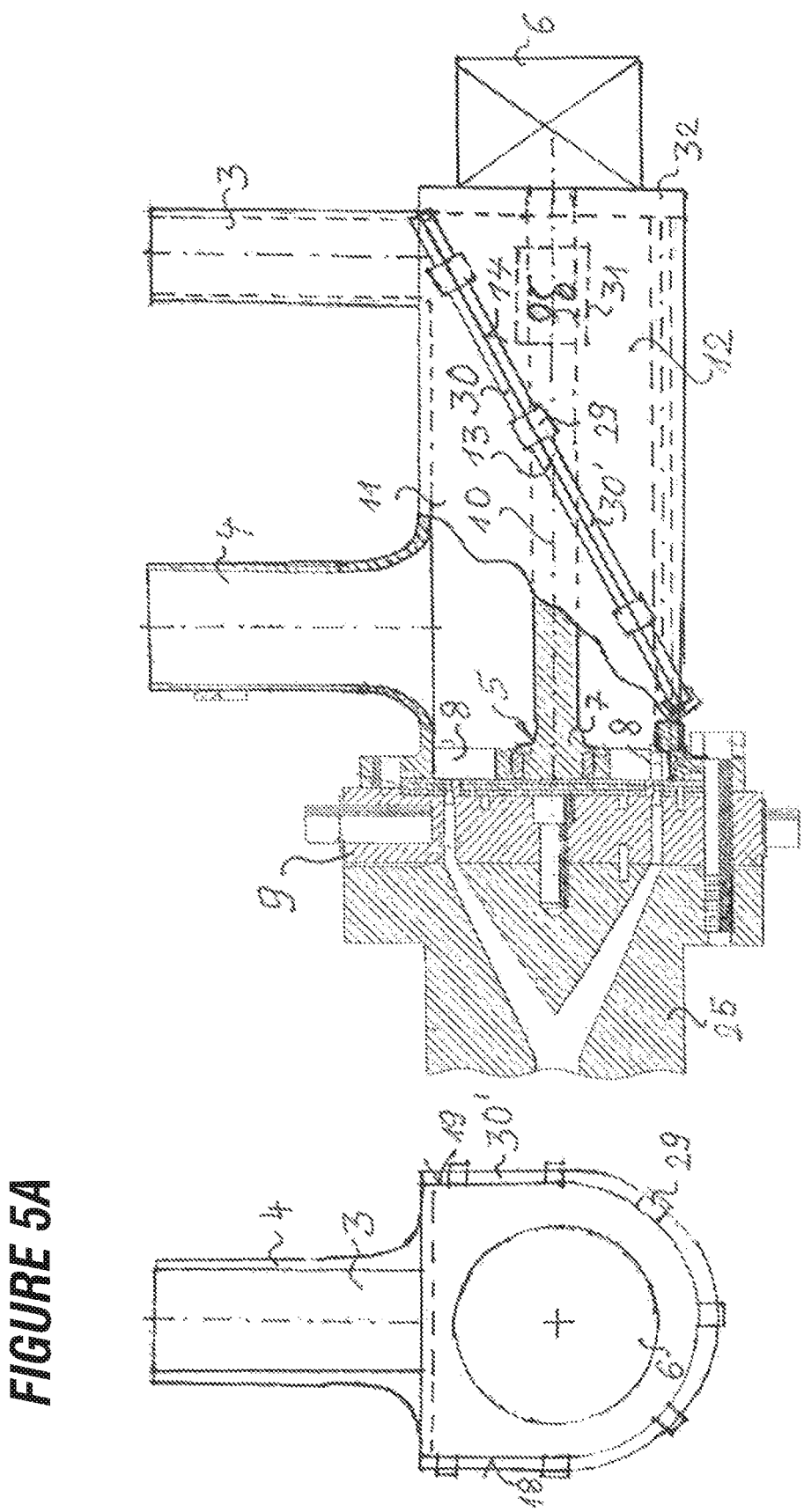
FIG. 5A shows an embodiment of the present disclosure with shortened lower and upper cutting chamber housing halves, wherein the lower cutting chamber housing half is formed as a U-shaped cover mountable to and fixable at the upper cutting chamber housing half by means of clamping elements, in cross-section as a longitudinal side view and a rear side view.

FIG. 5A shows an embodiment of the present disclosure with shortened lower and upper cutting chamber housing halves, wherein the lower cutting chamber housing half is formed as a U-shaped cover mountable to and fixable at the upper cutting chamber housing half by means of clamping elements, in cross-section as a longitudinal side view and a rear side view.

The lower and upper cutting chamber housing halves 11 and 12 are kept together by a rear wall 32. The lower cutting chamber housing half 12 is designed as a U-shaped cover attachable from below to the upper stationary cutting chamber housing half 11. At the rear wall 32 of the cutting chamber housing 2 of this embodiment, the rotary drive 6 is arranged outside of the cutting chamber 2. Clamping elements 29 on the edge regions of the cutting chamber housing halves 11 and 12 along the separation plane 13 the cutting chamber housing halves 11 and 12 fix the halves in a medium-tight manner. The edge regions of the housing halves 11 and 12 can comprise flange regions 30 and/or 30' along the separation plane 13 which can be encompassed by the clamping elements, and the flange regions can further comprise sealing elements.

FIG. 5B shows the embodiment pursuant to FIG. 5A with removed lower cutting chamber housing half, in cross-section as a longitudinal side view and a rear side view.

In this embodiment, the cutting chamber housing half 12 is a removable cover, wherein the edge region to the separation plane 13 comprises a flange region 30' which cooperates with the flange region 30 of the upper housing half 11. At the upper housing half 11 the rear side 32 of the cutting chamber housing 2 is also fixed, which in turn carries the rotary drive 6 fixed outside of the cutting chamber housing 2.

The rotary drive 6 can be, by means of a journal 33 and a spring-biased coupling member 31, connected with the drive shaft 34 of a self-aligning and cutting knife 8 self-adjusting cutting head 7. By means of the coupling member 31 it is possible to remove the self-adjusting cutting head 7 from the cutting chamber housing 2 at any time for inspection, maintenance, and repair when the lower housing half 12 has been removed.

Figure 6A:
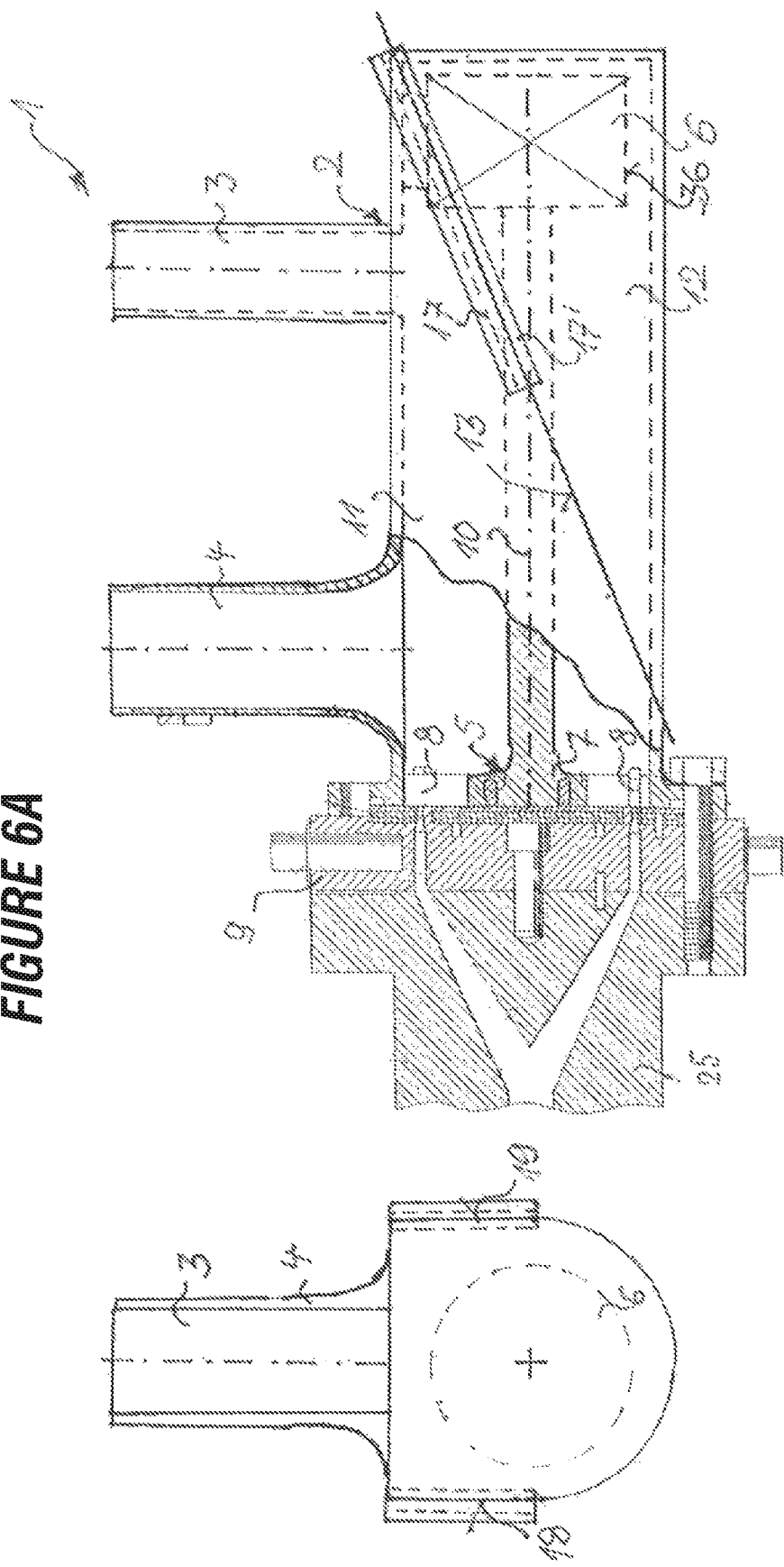
FIG. 6A shows yet another embodiment of the present disclosure with engaged slide bars between the upper and lower cutting chamber housing halves, in cross-section as a longitudinal side view and a rear side view.

FIG. 6A shows yet another embodiment of the present disclosure with engaged slide bars between the upper and lower cutting chamber housing halves, in cross-section as a longitudinal side view and a rear side view.

These slide bars can be arranged in a linear edge region of the cutting chamber housing along the separation plane 13 on a front boundary edge 18, or on the rear linear boundary edge 19. These engaged slide bars 17 and 17' on linear regions of the boundary edges 18 and 19 of the upper cutting chamber housing half 11 and/or the lower cutting chamber housing half 12 enable a linear displacement of the slide bars 17 and 17' in opposite directions, wherein the slide bar 17 forms a stationary slide bar 17 on the upper stationary housing half 11 while the slide bar 17' can also be designed in the form of slide elements on the lower movable housing half 12.

Figure 6B:
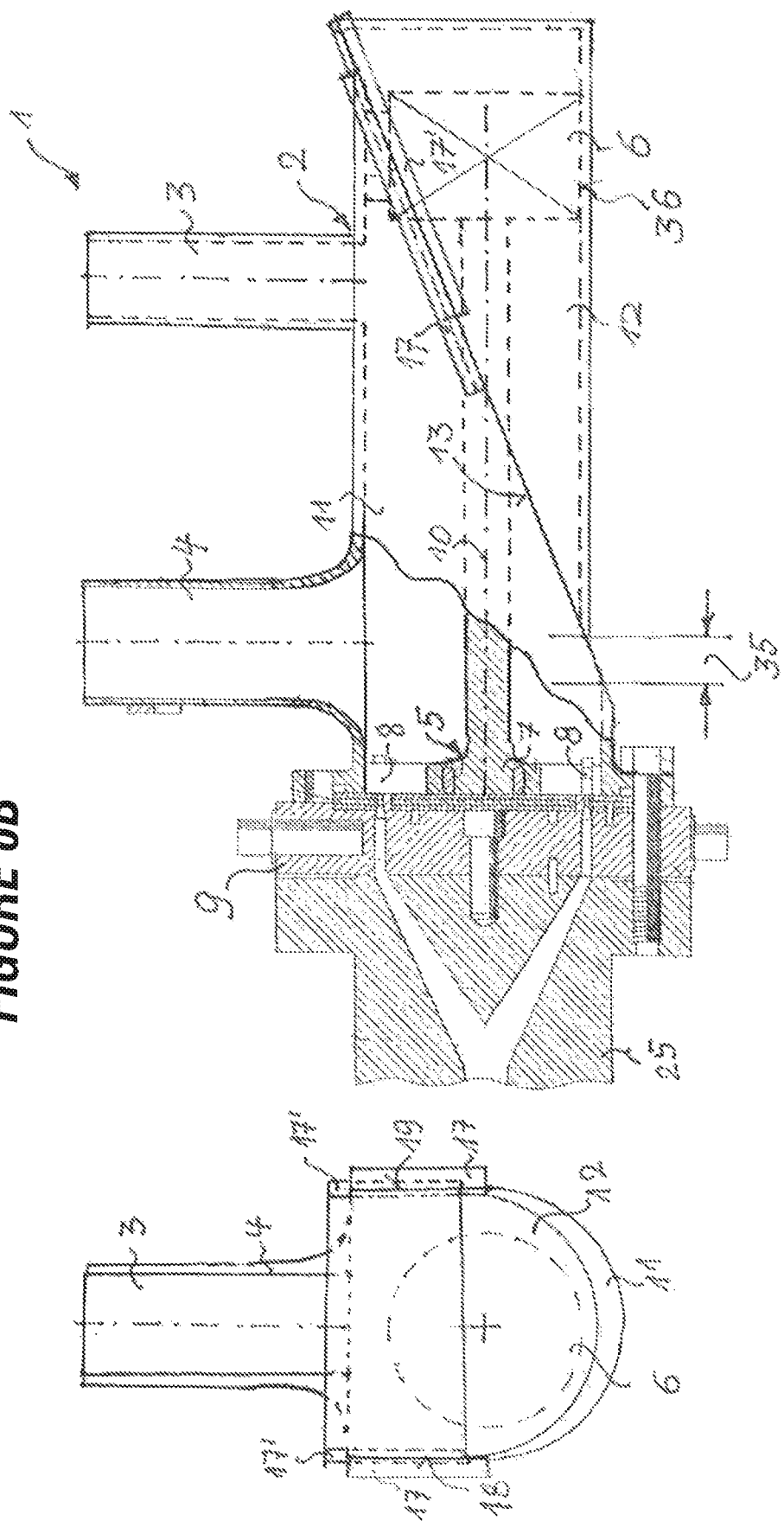
FIG. 6B shows the embodiment pursuant to FIG. 6A with upper and lower cutting chamber housing halves displaced in opposite directions, in cross-section as a longitudinal side view and a rear side view.

FIG. 6B shows the embodiment pursuant to FIG. 6A with upper and lower cutting chamber housing halves displaced in opposite directions, in cross-section as a longitudinal side view and a rear side view.

When the lower housing half 12 is displaced relative to the upper housing half 11, a gap 35 is opened in the region of the cutting device 5. The width of this gap 35 is confined by a lower edge 36 of the rotary drive 6 in the illustrated embodiment. The confinement of the gap 35 in a lower region below the cutting head 7 has the advantage that, even while cooling fluid flows in, the function of the perforated plate 9 with the horizontal output of plastic melt can be maintained with little loss of cooling fluid, and the chipped or cut pellets may be discharged in an initial stage downwards through the gap 35 and be observed until a perfect balance is given both in thermal and production stability.

Figure 7A:
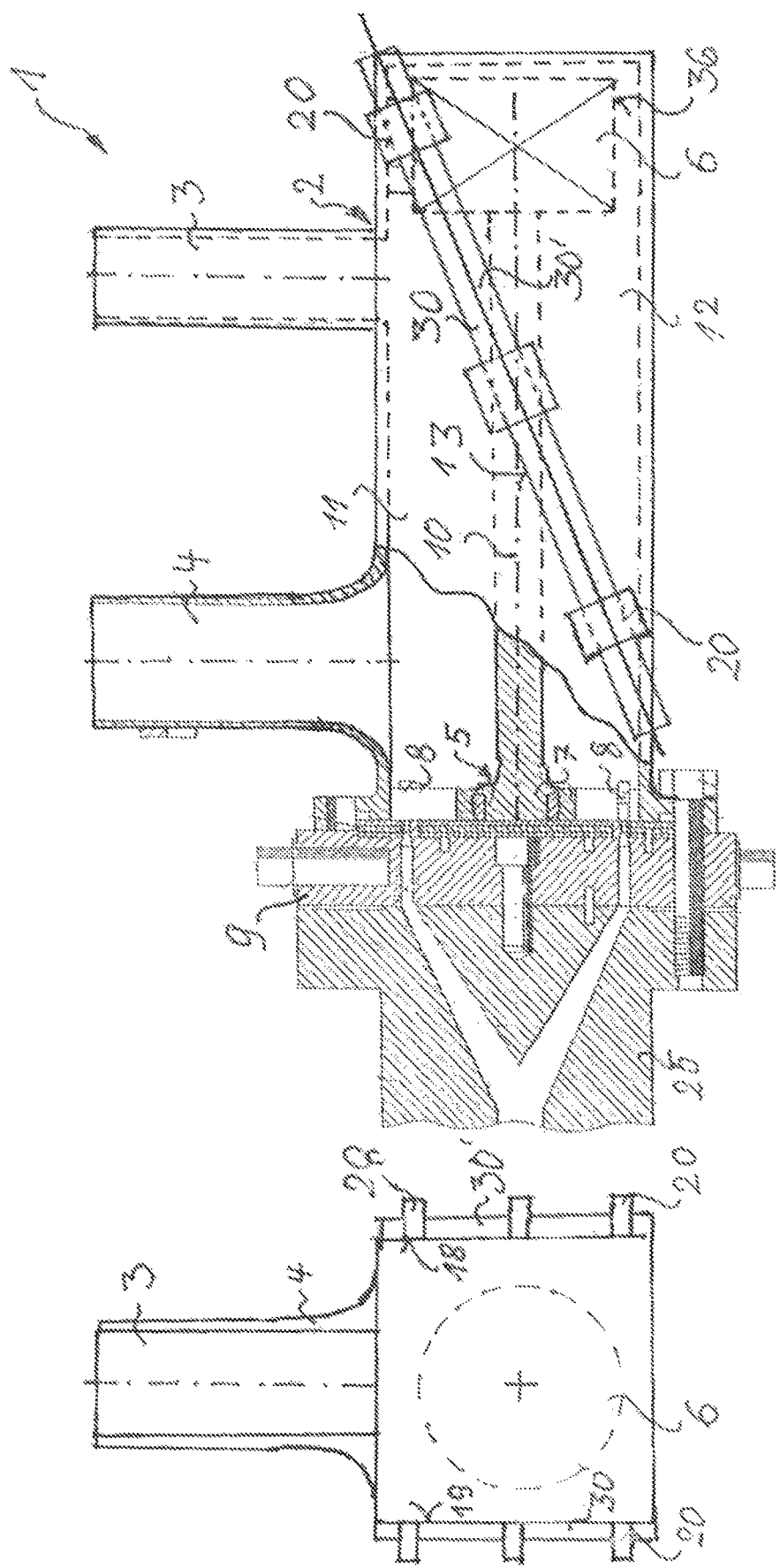
FIG. 7A shows a further embodiment of the present disclosure with latching elements between the upper and lower cutting chamber housing halves, in cross-section as a longitudinal side view and a rear side view.

FIG. 7A shows a further embodiment of the present disclosure with latching elements between the upper and lower cutting chamber housing halves, in cross-section as a longitudinal side view and a rear side view.

In this embodiment, a cuboid cutting chamber housing comprises linear front and rear boundary edges 18 and/or 19. The linear front and rear boundary edges 18 and 19 comprise flange regions 30 at the upper cutting chamber housing half 11, and flange regions 30' at the lower housing chamber half 12. Due to the cuboid design of the cutting chamber housing, the flange regions can be on the full length of the boundary edges 18 and 19. In this embodiment three latching elements are arranged on each of the boundary edges by means of which the flange regions 30 and/or 30' are held together by means of latching of the latching elements in the flange regions.

Figure 7B:
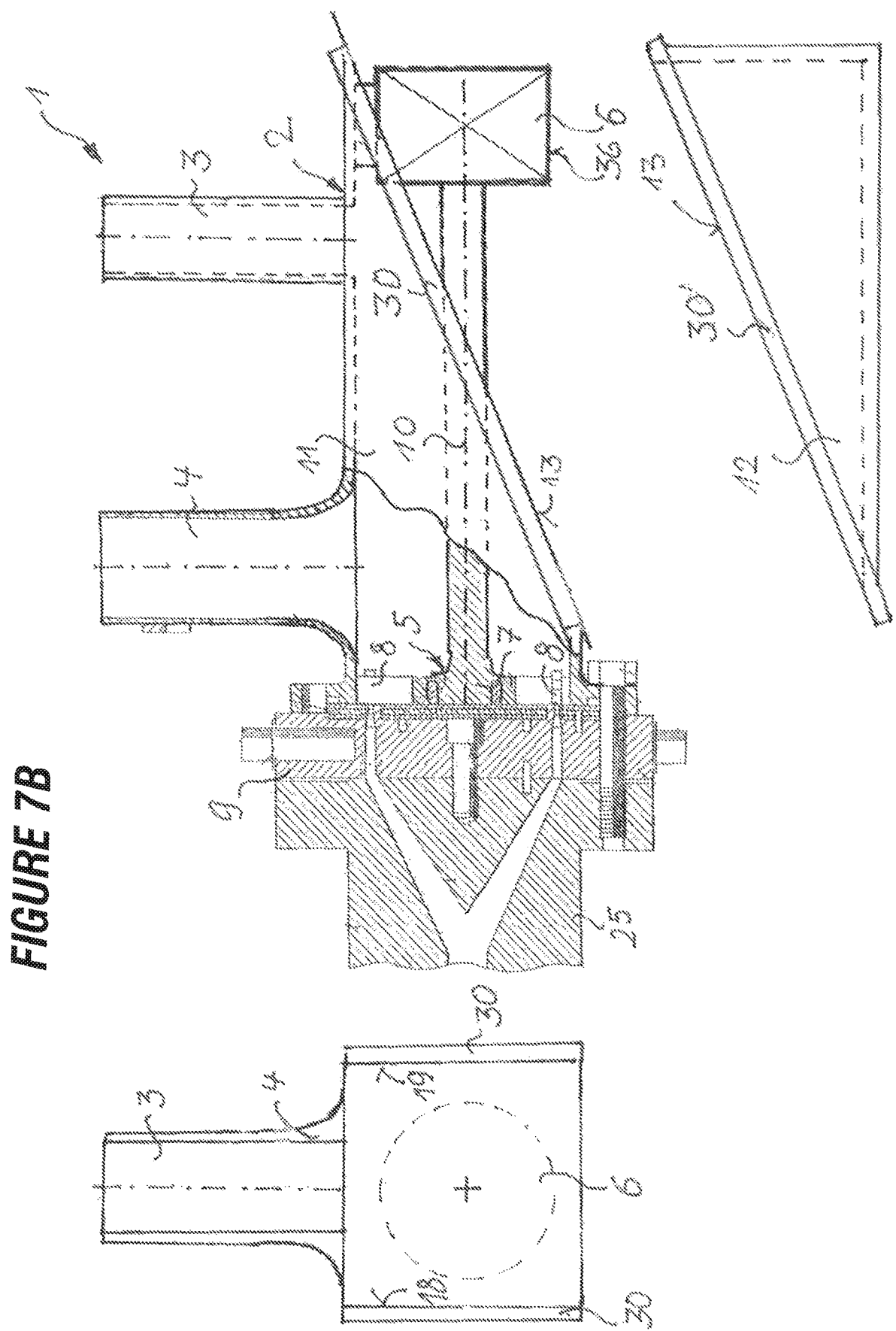
FIG. 7B shows the embodiment pursuant to FIG. 7A with removed latching elements and removed lower cutting chamber housing half, in cross-section as a longitudinal side view and a rear side view.

FIG. 7B shows the embodiment pursuant to FIG. 7A with removed latching elements and removed lower cutting chamber housing half, in cross-section as a longitudinal side view and a rear side view.

By releasing and/or opening of the latching elements 20 it is possible to remove the lower housing half 12 from the upper housing half 11, so that the exiting of plastic melt from the perforated plate in the initial stage can be controlled and the cutting and/or chipping of pellets by the rotary cutting device can also be observed.

Moreover, the latching elements can comprise two states. In a first state they are opened partially only, so that a minimum gap is produced through which, in the initial stage, the non-usable material of the plastic melt and of the irregularly chipped pellets may exit downwards and laterally between the upper housing half 11 and the lower housing half 12. Only after the releasing in a second latching state of the latching elements 20 is the separating of the lower housing half 12 as illustrated in FIG. 6B possible.

The present disclosure has been presented for the purpose of illustration and description, but it is not intended that it is exhausting or restricting. Many modifications and variations will be obvious for the person skilled in the art. The exemplary embodiments have been chosen to describe the principles and the practical application and to enable others with expertise of the state of the art to understand the disclosure of the different embodiments with different modifications, as they are suitable for the specifically considered use.

Therefore the present description, although illustrated exemplary embodiments have been described herein with reference to the accompanying drawings, is not restricting and that various other amendments and modifications thereof may be used by a person skilled in the art without deviating from the scope of protection and the gist of the disclosure which is defined and claimed with the enclosed claims.

What is claimed is:

1. A cutting chamber housing for an underwater pelletizer comprising:
   a. an inlet for cooling fluid;
   b. an outlet for cooling fluid with pellets;
   c. a cutting device comprising a rotary drive and a cutting head with rotating cutting knives;
   d. an extrusion head comprising a perforated plate for outputting molten plastic formed into strands;
   e. a stationary upper housing half comprising a front slide bar and a rear slide bar; and
   f. a movable lower housing half along a separation plane arranged at an oblique angle, wherein the movable lower housing half is swivel-mounted and slidably connected to the stationary upper housing half by at least one swivel joint; and
   wherein the movable lower housing half comprises a front sliding element slidably engaged with the front slide bar and a rear sliding element slidably engaged with the rear slide bar; and further wherein, an output direction of the molten plastic and an axis of rotation of the cutting device are oriented orthogonally to the inlet and the outlet, and further wherein, the separation plane extends obliquely in the longitudinal direction of the cutting chamber housing enabling the cutting chamber housing to be opened at least downwards along the separation plane.

2. The cutting chamber housing of claim 1, wherein the separation plane extends relative to the output direction obliquely from below the region of the perforated plate to the top above the region of the rotary drive.

3. The cutting chamber housing of claim 1, wherein the separation plane extends diagonally from top to bottom.

4. The cutting chamber housing of claim 1, wherein the separation plane extends along a diagonal of the cutting chamber housing from below the region of the perforated plate to above the region of the rotary drive.

5. The cutting chamber housing of claim 1, wherein the swivel joint is arranged between the stationary upper housing half and the movable lower housing half such that its swivel axis is arranged horizontally and above the region of the rotary drive.

6. The cutting chamber housing of claim 1, wherein the swivel joint is arranged between the stationary upper housing half and the movable lower housing half such that its swivel axis is on a front or rear boundary edge of the cutting chamber housing.

7. The cutting chamber housing of claim 1, wherein the movable lower housing half is rotatably connected with the stationary upper housing half by at least one rotary joint.

8. The cutting chamber housing of claim 1, wherein the swivel joint comprises at least one rotary joint oriented along the swivel axis.

9. The cutting chamber housing of claim 1, wherein the movable lower housing half is connected with the stationary upper housing half with latching elements.

10. The cutting chamber housing of claim 1, wherein the movable lower housing half is lockably connected with the stationary upper housing half.

11. The cutting chamber housing of claim 10, wherein the movable lower housing half is connected with the stationary upper housing half with a linear bayonet lock.

12. The cutting chamber housing of claim 1, wherein the inlet for cooling fluid and the outlet for cooling fluid with pellets are arranged on the stationary upper housing half.

13. The cutting chamber housing of claim 1, wherein the rotary drive partially projects out of the upper stationary housing half downwards from the separation plane.

14. The cutting chamber housing of claim 1, wherein the movable lower housing half comprises deflection structures to force cooling fluid into a spiral circulation between the upper and lower housing halves.

15. The cutting chamber housing of claim 1, wherein the movable lower housing half comprises deflection structures to force cooling fluid vertically upwards into the outlet.

16. The cutting chamber housing of claim 1, wherein the cutting chamber housing comprises pressure casting material of a metal alloy.

17. A cutting chamber housing for an underwater pelletizer comprising:
   a. a cutting device comprising a rotary drive and a cutting head with rotating cutting knives;
   b. an extrusion head comprising a perforated plate for outputting molten plastic formed into strands;
   c. a stationary upper housing half having an inlet for cooling fluid extending upward and an outlet for cooling fluid with pellets extending upward; and
   d. a movable lower housing half along a separation plane arranged at an oblique angle; and
   wherein, an output direction of the molten plastic and an axis of rotation of the cutting device are oriented orthogonally to the inlet and the outlet, and further wherein, the separation plane extends obliquely in the longitudinal direction of the cutting chamber housing enabling the cutting chamber housing to be opened at least downwards along the separation plane, and further wherein the stationary upper housing half contains the cutting device when the movable lower housing half is displaced.

* * * * *